Patented Oct. 13, 1931

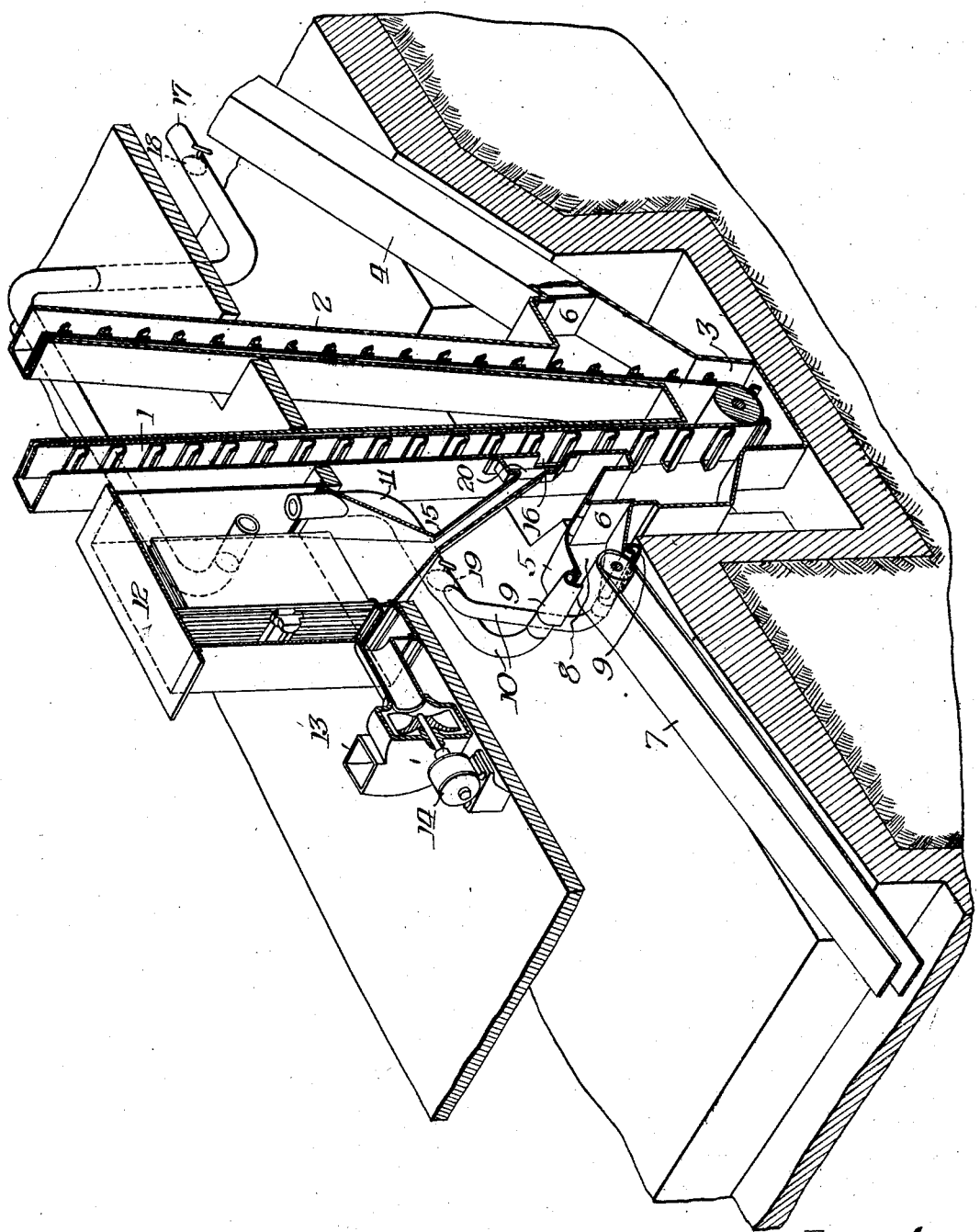

1,827,326

UNITED STATES PATENT OFFICE

RAYMOND H. MOORE, OF CHICAGO, ILLINOIS

MATERIAL CONVEYING SYSTEM

Application filed April 19, 1926. Serial No. 102,852.

My invention relates to material conveying systems, and more particularly to such systems as are used in connection with grain elevators and the like.

One of the objects of my invention is to take care of the material which tends to escape from the material being conveyed, such as dust and chaff from grain conveyed by a belt conveyor, and at the same time to prevent the loss of that material from the main body of material, as for example, preventing the loss of dust and chaff from grain, thereby avoiding the monetary loss of losing such material.

Other objects of the invention will appear and be pointed out hereinafter.

The accompanying drawing is a sectional perspective elevation showing an embodiment of my invention.

The invention is shown applied to grain conveying apparatus for a grain elevator; but it will be understood to have other uses and applications.

Referring more particularly to the drawing, 1 is a bucket type belt elevator such as used in a grain elevator, 2 the enclosure for the same having a pit 3 and chutes 4 and 5 closed with flap valves 6. A belt conveyor 7 cooperates with chute 5 and elevator 1. Above and below the opening 8 of chute 5 are ventilating hoods 9 in exhaust communication with pipes 10 which unite in pipe 11 leading to dust filter 12. Fan 13 driven by a motor 14 supplies the exhaust circulation through filter 12 from the converging bottom of which a chute 15 leads to an opening 16 in elevator enclosure 2. Exhaust pipe 17 leads to filter 12 from another conveyor (not shown). Dampers 18 and 19 are provided in pipes 17 and 11 respectively, to shut off the exhaust in either pipe as desired.

In operation, grain or other dust laden material is carried by conveyor 7 and discharged into pit 3 through chute 5 and hoisted by elevator 1 to a garner.

The dust released from the grain 7 is taken up through ventilating hoods 9 and drawn through exhaust pipes 10 and 11 to filter 12. Accumulations of dust in the filter 12 will fall as solid matter to the converging bottom and pass through chute 15 and opening 16, and be deposited on the buckets of the elevator by which it will be lifted with the grain. Flap valves 6 prevent the dust from escaping from housing 2 or pit 3 through the chute opposite to the one through which material is being delivered. Dampers 18 and 19 may be closed or opened as desired, according to which of the conveyors is in operation. Flap valve 20 prevents any suction being applied to the grain in the buckets of elevator 1.

Thus it will be seen that dust may be removed from grain by hoods 9—9, and so prevented from dropping on the floor and also prevented from making a fire hazard; and it will also be seen that this dust will be returned to the grain by chute 15, and so while the injurious effects of the escaping dust are prevented by hoods 9—9, the weight of the dust is restored to the grain and so the monetary loss that would occur as a result of the complete removal, of that dust is avoided. Reference is made to my United States Patent No. 1,502,050, July 22, 1924, ventilating means for the receivers of belt conveyors.

It will be understood that changes and modifications may be made without departing from the spirit of the invention.

What I claim is:

1. In apparatus of the class specified, in combination, a belt conveyor, a bucket elevator, and a circulating system adapted to remove light material from the conveyor and deliver it to the bucket elevator.

2. In apparatus of the class specified, in combination, a belt conveyor, an enclosed bucket elevator, an exhaust air separating system, a residuum chute, whereby light material from the conveyor is collected and arrested and the residuum delivered to the elevator, and means for preventing suction or exhaust pressure from being applied to the bucket conveyor.

3. In apparatus of the class specified, in combination, a belt conveyor, an enclosed bucket elevator, an exhaust air system comprising a power driven fan, a dust separator, a ventilating hood, a duct, and a residuum chute, whereby dust from the conveyor is collected, removed, arrested and delivered to the elevator as solid matter.

4. In apparatus of the class specified, in combination, a belt conveyor discharging through a flap valve into an elevator, pneumatic means for collecting and removing dust released from said conveyor, and means for delivering said dust as accumulated to the elevator.

5. The combination with a bucket conveying means, of a belt conveyor carrying material to said conveying means, pneumatic means for collecting light material escaping from belt conveyor in the neighborhood of the delivery of material from said belt conveyor, and means for delivering said light material to said conveying means.

6. The combination in a grain elevator of a bucket conveyor for carrying grain, a delivery belt for conveying grain to the bucket conveyor, suction hoods for collecting light material escaping from the delivery end of the belt conveyor, and means for delivering such light material to the bucket conveyor.

7. The combination in a grain elevator, of a bucket conveyor for carrying grain, a delivery belt for conveying grain to the bucket conveyor, suction hoods for collecting light material escaping from the delivery end of the belt conveyor, means for delivering such light material to the bucket conveyor, and means for preventing suction or exhaust pressure from being applied to the bucket conveyor.

8. The combination in a grain elevator, of a bucket conveyor for carrying grain, a delivery belt for conveying grain to the bucket conveyor, a suction hood for collecting light material escaping from the delivery end of the belt conveyor, means for delivering such light material to the bucket conveyor, and means for preventing suction or exhaust pressure from being applied to the bucket conveyor, said last mentioned means comprising a flap valve permitting the downward delivery of dust to the bucket conveyor, but preventing suction pressure in the opposite direction.

9. The combination with a substantially smooth belt conveyor, of unloading means for said belt conveyor, involving a chute into which the belt discharges its load, pneumatic means for collecting material escaping in the proximity of the discharge end of the belt conveyor and means for delivering said collected material to the material being conveyed.

10. The combination with a belt conveyor, of a receiver therefor involving a chute into which the belt discharges its load, a suction hood in operative relation to the mouth of the receiver for collecting material escaping from the conveyor and means for delivering the collected material to the material being conveyed.

11. The combination of a belt conveyor, a receiver into which the belt discharges its load, a suction hood in operative relation to the mouth of the receiver and above the plane at which the belt discharges its load, said hood being adapted to collect the material escaping from the conveyor and means for returning the collected material to the material being conveyed.

12. The combination of a belt conveyor, a receiver therefor involving a chute into which the belt discharges its load, a suction hood in operative relation to the return side of said belt and adapted to collect material escaping from the conveyor, and means for returning the collected material to the material being conveyed.

13. The combination with a belt conveyor of pneumatic means for collecting material escaping at the unloading end of said belt conveyor and means for delivering said collected material to the main body of material from which it was withdrawn.

14. The combination with means for conveying and unloading material, of pneumatic means for collecting material escaping from the unloading end of said unloading means and means for redelivering said material to the main body of material from which it was separated.

15. The combination of a belt conveyor, a receiver therefor involving a chute into which the belt discharges its load, a suction hood in operative relation to the mouth of the receiver and above the plane at which the belt discharges its load, a suction hood in operative relation to the return side of said belt and adapted to collect material escaping from the conveyor, and means for returning the collected material to the material being conveyed.

In witness whereof, I hereunto subscribe my name this 26th day of March, A. D. 1926.

RAYMOND H. MOORE.